United States Patent [19]

Eckel et al.

[11] Patent Number: 5,104,945
[45] Date of Patent: Apr. 14, 1992

[54] HEAT RESISTANT POLYCARBONATE MOLDING COMPOSITIONS

[75] Inventors: Thomas Eckel, Dormagen; Dieter Wittmann, Cologne; Dieter Freitag, Krefeld; Uwe Westeppe, Mettmann; Karl-Heinz Ott, Leverkusen, all of Fed. Rep. of Germany

[73] Assignee: Bayer Aktiengesellschaft, Leverkusen, Fed. Rep. of Germany

[21] Appl. No.: 510,345

[22] Filed: Apr. 17, 1990

[30] Foreign Application Priority Data

Apr. 21, 1989 [DE] Fed. Rep. of Germany ....... 3913114

[51] Int. Cl.⁵ .................... C08L 69/00; C08F 283/12
[52] U.S. Cl. .................... 525/464; 525/474; 525/479; 525/63
[58] Field of Search .............. 525/67, 63, 100, 101, 525/464, 479, 146, 69

[56] References Cited

U.S. PATENT DOCUMENTS 4,806,593  2/1989  Kress et al. ............................ 525/63
4,982,014  1/1991  Freitag ................................. 568/721

Primary Examiner—John C. Bleutge
Assistant Examiner—R. Dean, Jr.
Attorney, Agent, or Firm—Joseph C. Gil; Richard E. L. Henderson

[57] ABSTRACT

Thermoplastic molding compositions comprising mixtures of a) 1–99 wt. % of a specific polycarbonate based on dihydroxydiphenylcycloalkanes, b) 1–99 wt. % of other polycarbonate, in particular those based on bisphenol A, and c) 1–95 wt. % of a silicone rubber, in particular silicone graft rubbers, having improved thermal resistance and being suitable for the preparation of shaped articles, and a process for their preparation are being disclosed.

10 Claims, No Drawings

HEAT RESISTANT POLYCARBONATE MOLDING COMPOSITIONS

BACKGROUND OF THE INVENTION

Field of the Invention

The invention relates to heat resistant thermoplastic molding compositions comprising polycarbonates based on specific dihydroxydiphenylcycloalkanes and silicone rubbers, a process for their preparation and their use for the production of shaped articles.

SUMMARY OF THE INVENTION

The invention relates to thermoplastic molding compositions comprising mixtures of
a) 1–99 wt. %, preferably 10–90 wt. %, of specific polycarbonates based on dihydroxydiphenylcycloalkanes of the formula (I), and
b) 1–99 wt. %, preferably 10–90 wt. %, of other polycarbonates, in particular those based on bisphenol A and
c) 1–95 wt. %, preferably 2–60 wt. %, in particular 3–40 wt %, of silicone rubbers, in particular silicone graft rubbers.

DETAILED DESCRIPTION OF THE INVENTION

Polycarbonate (a)

These are specific polycarbonates based on dihydroxydiphenylcycloalkanes of the formula (I)

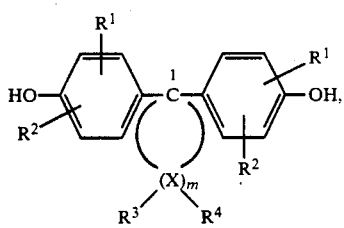

wherein
$R^1$ and $R^2$ independently of one another denote hydrogen, halogen, preferably chlorine or bromine, $C_1$–$C_8$-alkyl, $C_5$–$C_6$-cycloalkyl, $C_6$–$C_{10}$-aryl or $C_7$–$C_{12}$-aralkyl,
m denotes an integer from 4 to 7, preferably 4 or 5,
$R^3$ and $R^4$ are selected individually for each X and independently of one another denote hydrogen or $C_1$–$C_6$-alkyl and
x denotes carbon,
with the proviso that on at least one atom X, $R^3$ and $R^4$ are simultaneously alkyl.

The polycarbonates (a) as well as the starting components used in their preparation are described in German Patent Application P 3 832 396.6.

Preferably, in the dihydroxydiphenylcycloalkanes of the formula (I), $R^3$ and $R^4$ are simultaneously alkyl on 1–2 atoms X, in particular on only one atom X. The preferred alkyl radical is methyl; the X atoms in the α-position relative to the diphenyl-substituted C atom (C-1) are preferably not dialkyl-substituted, whereas alkyl-disubstitution in the β-position relative to C-1 is preferred.

Preferred dihydroxydiphenylcycloalkanes of the formula (I) are those with with 5 or 6 ring C atoms in the cycloaliphatic radical (m=4 or 5 in formula (I)), for example the diphenols of the formula

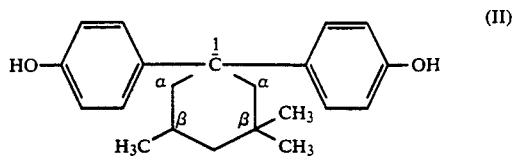

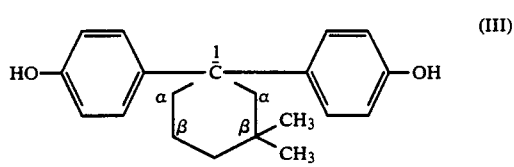

and

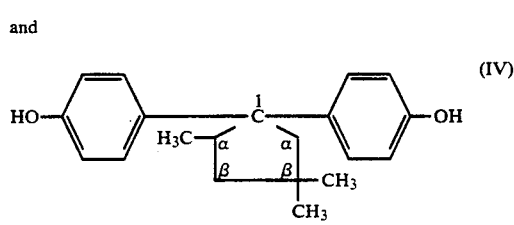

1,1-bis-(4-hydroxyphenyl)3,3,5-trimethylcyclohexane (formula II) being particularly preferred.

The dihydroxydiphenylcycloalkanes of the formula (I) can be prepared in a manner which is known per se by condensation of phenols of the formula (V)

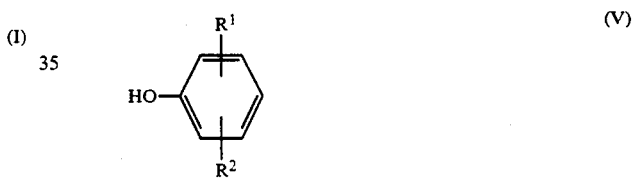

and ketones of the formula (VI)

wherein, in the formula (V) and (VI) X, $R^1$, $R^2$, $R^3$, $R^4$ and m have the meaning given for formula (I).

The phenols of the formula (V) are either known from the literature or obtainable by processes which are known from the literature (see, for example, for cresols and xylenols Ullmanns Encyclopadie der Technischen Chemie, (Ullmanns Encyclopaedia of Industrial Chemistry), 4th revised and expanded edition, volume 15, pages 61–77, Verlag Chemie Weinheim-New York 1978; for chlorophenols Ullmanns Encyclopadie der Technischen Chemie (Ullmanns Encyclopaedia of Industrial Chemistry), 4th edition, Verlag Chemie, 1975, volume 9, pages 573–582; and for alkylphenols Ullmanns Encyclopädie der Technischen Chemie (Ullmanns Encyclopaedia of Industrial Chemistry), 4th edition, Verlag Chemie 1979, volume 18, pages 191–214).

Examples of suitable phenols of the formula (V) are: phenol, o-cresol, m-cresol, 2,6-dimethylphenol, 2-chlorophenol, 3-chlorophenol, 2,6-dichloro-phenol, 2-cyclohexylphenol, phenylphenols and o- or p-benzylphenols.

The ketones of the formula (VI) are known from the literature (see, for example, Beilsteins Handbuch der Organischen Chemie (Beilsteins Handbook of Organic Chemistry), 7th volume, 4th edition, Springer-Verlag, Berlin, 1925 and the corresponding supplement volumes 1 to 4, and J. Am. Chem. Soc. vol. 79 (1957), pages 1488, 1490 and 1491, Allen et al. U.S. Pat. No. 2,692,289, J. Chem. Soc., (1954), 2186, 2191 and J. Org. Chem. vol. 38, no. 26, (1973), pages 4431 et seq. and J. Am. Chem. Soc. 87, (1965), page 1353 et seq., in particular page 1355). A general process for the preparation of ketones of the formula (VI) is described, for example, in "Organikum, 15th edition, 1977, VEB-Deutscher Verlag der Wissenschaften, Berlin, page 698.

Examples of known ketones of the formula (VI) are: 3,3-dimethylcyclopentanone, 2,2-dimethylcyclohexanone, 3,3-dimethylcyclohexanone, 4,4-dimethylcyclohexanone, 3-ethyl-3-methylcyclopentanone, 2,3,3-trimethylcyclopentanone, 2,4,4-trimethylcyclopentanone, 3,3,4-trimethylcyclopentanone, 3,3-dimethylcycloheptanone, 4,4-dimethylcycloheptanone, 3-ethyl-3-methylcyclohexanone, 4-ethyl-4-methylcyclohexanone, 2,3,3-trimethylcyclohexanone, 2,4,4-trimethylcyclohexanone, 3,3,4-trimethylcyclohexanone, 2,5,5-trimethylcyclohexanone, 3,3,5-trimethylcyclohexanone, 3,4,4-trimethylcyclohexanone, 2,3,3,4-tetramethylcyclopentanone, 2,3,4,4-tetramethylcyclopentanone, 3,3,4,4-tetramethylcyclopentanone, 2,2,5-trimethylcycloheptanone, 2,2,6-trimethylcycloheptanone, 2,6,6-trimethylcycloheptanone, 3,3,5-trimethylcycloheptanone, 3,5,5-trimethylcycloheptanone, 5-ethyl-2,5-dimethylcycloheptanone, 2,3,3,5-tetramethylcycloheptanone, 2,3,5,5-tetra-methylcycloheptanone, 3,3,5,5-tetramethylcycloheptanone, 4-ethyl-2,3,4-trimethylcyclopentanone, 2-isopropyl-4,4-dimethylcyclopentanone, 4-isopropyl-2,4-dimethylcyclopentanone, 2-ethyl-3,5,5-trimethylcyclohexanone, 3-ethyl-3,5,5-trimethylcyclohexanone, 3-ethyl-4-isopropyl-3-methylcyclopentanone, 4-sec.-butyl-3,3-dimethylcyclopentanone, 2-isopropyl-3,3,4-trimethylcyclopentanone, 3-ethyl-4-isopropyl-3-methylcyclohexanone, 4-ethyl-3-isopropyl-4-methylcyclohexanone, 3-sec.-butyl-4,4-dimethylcyclohexanone, 3-isopropyl-3,5,5-trimethylcyclohexanone, 4-isopropyl-3,5,5-trimethylcyclohexanone, 3,3,5-trimethyl-5-propylcyclohexanone, 3,5,5-trimethyl-5-propylcyclohexanone, 2-butyl-3,3,4-trimethylcyclopentanone, 2-butyl-3,3,4-trimethylcyclohexanone, 4-butyl-3,3,5-trimethylcyclohexanone, 3-isohexyl-3-methylcyclohexanone, 5-ethyl-2,4-diisopropyl-5-methylcyclohexanone, 2,2-dimethylcyclooctanone, and 3,3,8-trimethylcyclooctanone.

Examples of preferred ketones are

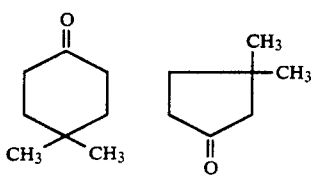

-continued

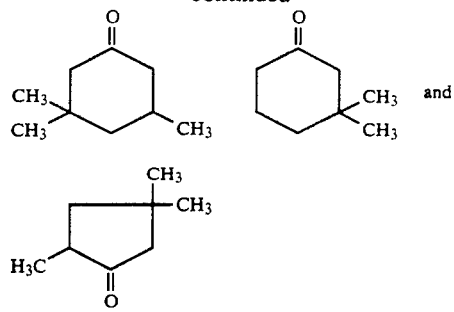

To prepare the bisphenol, in general 2 to 10 mol, preferably 2.5 to 6 mol, phenol (V) are used per mol of ketone (VI). Preferred reaction times are 1 to 100 hours. The reaction is in general carried out at temperatures from −30° C. to 300° C., preferably from −15° C. to 150° C., under pressures of 1 to 20 bar, preferably 1 to 10 bar.

The condensation is in general carried out in the presence of acid catalysts. Examples are hydrogen chloride, hydrogen bromide, hydrogen fluoride, boron trifluoride, aluminum trichloride, zinc dichloride, titanium tetrachloride, tin tetrachloride, phosphorus halides, phosphorus pentoxide, phosphoric acid, concentrated hydrochloric acid or sulfuric acid and mixtures of acetic acid and acetic anhydride. It is also possible to use acid ion exchanges.

The reaction may be accelerated by addition of co-catalysts, such as $C_1$-$C_{18}$-alkyl-mercaptans, hydrogen sulphide, thiophenols, thio acids and dialkyl sulphides.

The condensation can be carried out without a solvent or in the presence of an inert solvent (e.g. aliphatic and aromatic hydrocarbons or chlorohydrocarbons).

In cases where the catalyst simultaneously functions as a dehydrating agent, it is not necessary to employ an additional dehydrating agent, but the latter is advantageous in all cases for achieving good conversions if the catalyst employed does not bond the water of reaction.

Examples of suitable dehydrating agents are acetic anhydride, zeolites, polyphosphoric acid and phosphorus pentoxide.

The phenol (V) and ketone (VI) can be reacted in a molar ratio of (V):(VI)=2:1 to 10:1, preferably 2.5:1 to 6:1, at temperatures of −30° C. to 300° C., preferably −15° C. to 150° C., under pressures of 1 to 20 bar, preferably 1 to 10 bar, in the presence of acid catalysts and optionally in the presence of co-catalysts and/or solvents and/or dehydrating agents.

In some cases, the reaction does not proceed completely uniformly, i.e. several different products may be formed, so that the desired compound initially has to be isolated from a mixture. For details of the condensation, reference is made to Schnell, Chemistry and Physics of Polycarbonates, Interscience Publishers, New York 1964. The reaction can sometimes be controlled by choosing appropriate catalysts and reaction conditions so that the desired compound precipitates or crystallizes, which facilitates its isolation.

It is possible to use either one diphenol of the formula (I) to form homopolycarbonates or several diphenols of the formula (I) to form copolycarbonates.

The diphenols of the formula (I) can also be used as a mixture with other diphenols, for example with those of the formula

HO—Z—OH (VII)

for the preparation of high molecular weight thermoplastic aromatic polycarbonates.

Suitable other diphenols of the formula HO—Z—OH (VII) are those in which Z is an aromatic radical with 6 to 30 C atoms, and may contain one or more aromatic nuclei, and may be substituted and may contain aliphatic radicals or cycloaliphatic radicals other than those of the formula (I) or hetero atoms as bridge members.

Examples of diphenols of the formula (VII) are
hydroquinone,
resorcinol,
dihydroxydiphenyls,
bis-(hydroxyphenyl)-alkanes,
bis-(hydroxyphenyl)-cycloalkanes,
bis-(hydroxyphenyl) sulphides,
bis-(hydroxyphenyl) ethers,
bis-(hydroxyphenyl) ketones,
bis-(hydroxyphenyl) sulphones,
bis-(hydroxyphenyl) sulphoxides, $\alpha,\alpha'$-bis-(hydroxyphenyl)-diisopropylbenzenes
and nuclear-alkylated and nuclear-halogenated compounds thereof.

These and other further suitable diphenols are described e.g. in U.S. Pat. Nos. 3,028,365, 2,999,835, 3,148,172, 3,275,601, 2,991,273, 3271,367, 3,062,781, 2,970,131 and 2,999,846, in German Offenlegungsschriften 1 570 703, 2 063 050, 2 063 052, and 2 211 0956, in French Patent Specification 1 561 518 and in the Monograph "H. Schnell, Chemistry and Physics of Polycarbonates, Interscience Publishers, New York 1964".

Examples of preferred other diphenols are:
4,4'-dihydroxydiphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
$\alpha,\alpha'$-bis-(4-hydroxyphenyl)-p-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxy-phenyl)-propane,
bis-(3,5-dimethyl-4-hydroxyphenyl) sulfone,
2,4-bis-(3,5-dimethyl-4-hydroxyphenyl)-2-methylbutane,
1,1-bis-(3,5-dimethyl-4-hydroxyphenyl)-cyclohexane,
$\alpha,\alpha'$-bis-(3,5-dimethyl-4-hydroxyphenyl)-p-diisopropylbenzene,
2,2-bis-(3,5-dichloro-4-hydroxyphenyl)-propane and
2,2-bis-(3,5-dibromo-4-hydroxyphenyl)-propane.

Examples of particularly preferred diphenols of the formula (VII) are:
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane and
1,1-bis-(4-hydroxyphenyl)-cyclohexane.

2,2-bis-(4-hydroxyphenyl)-propane is particularly preferred. These diphenols may be employed either individually or as a mixture.

The molar ratio of diphenols of the formula (I) to the other diphenols which are also to be used if appropriate, for example those of the formula (VII), should be 100 mol % (I) to 0 mol % other diphenol to 2 mol % (I) to 98 mol % other diphenol, preferably 100 mol % (I) to 0 mol % other diphenol to 5 mol % (I) to 95 mol % other diphenol, and in particular 100 mol % (I) to 0 mol % other diphenol to 10 mol % (I) to 90 mol % other diphenol, and especially 100 mol % (I) to 0 mol % other diphenol to 20 mol % (I) to 80 mol % other diphenol.

The high molecular weight polycarbonates from the diphenols of the formula (I), optionally in combination with other diphenols, may be prepared by the known polycarbonate preparation processes. In these processes, the various diphenols can be linked to one another either randomly or in blocks.

The polycarbonates may be branched in a manner which is known per se. If branching is desired, it can be achieved in a known manner by co-condensation of small amounts, preferably amounts between 0.05 and 2.0 mol % (based on the diphenols employed), of compounds having a functionality of three or more, in particular those with three or more phenolic hydroxyl groups. Some branching agents with three or more phenolic hydroxyl groups are
phloroglucinol,
4,6-dimethyl-2,4,6-tri-(4-hydroxyphenyl)-hept-2-ene,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2-bis-(4,4-bis-(4-hydroxyphenyl)-cyclohexyl)-propane,
2,4-bis-(4-hydroxyphenyl-isopropyl)-phenol,
2,6-bis-(2-hydroxy-5'-methyl-benzyl)-4-methylphenol,
2-(4-hydroxyphenyl)-2-(2,4-hydroxyphenyl)-propane,
hexa-(4-(4-hydroxyphenyl-isopropyl)-phenyl)orthoterephthalate,
tetra-(4-hydroxyphenyl)-methane,
tetra-(4-(4-hydroxyphenyl-isopropl)-phenoxy)-methane and
1,4-bis-((4'-,4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds in the customary concentrations are used as chain stoppers for regulation, which is known per se, of the molecular weight of the polycarbonates. Suitable compounds are e.g. phenol, tert.-butylphenols or other alkyl-$C_1$-$C_7$-substituted phenols. Small amounts of phenols of the formula (VIII)

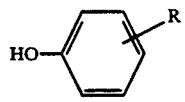

(VIII)

wherein R represents a branched $C_8$- and/or $C_9$-alkyl radical, are particularly suitable for regulating the molecular weight. Preferably, in the alkyl radical R, the content of $CH_3$ protons is between 47 and 89% and the content of CH and $CH_2$ protons is between 53 and 11%; also preferably, R is in the o- and/or p-position relative to the OH group, and particularly preferably the upper limit of the ortho-content is 20%. The chain stoppers are in general employed in amounts of 0.5 to 10, preferably 1.5 to 8 mol %, based on the diphenols employed.

The polycarbonates (a) can preferably be prepared in a manner which is known per se by phase interface polycondensation (c.f. H. Schnell, "Chemistry and Physics of Polycarbonates" Polymer Reviews, vol. IX, page 33 et seq., Interscience Publ., 1964). In this process, the diphenols of the formula (I) are dissolved in an aqueous alkaline phase. To prepare copolycarbonates with other diphenols, mixtures of diphenols of the formula (I) and the other diphenols, for example those of the formula (VII), are employed. Chain stoppers, e.g. of the formula (VIII), can be added to regulate the molecular weight. The reaction is then carried out in the presence of an inert organic phase, preferably which dissolves polycarbonate, using phosgene by the method of phase interface condensation. The reaction temperature is between 0° C. and 40° C.

The branching agents which may optionally be used (preferably 0.05 to 2 mol %) may either be taken with the diphenols in the aqueous-alkaline phase or added as a solution in the organic solvent before the phosgenation.

In addition to the diphenols of the formula (I) and if appropriate other diphenols (VII), it is possible to also use mono- and/or bis-chlorocarbonic acid esters thereof, these being added as a solution in organic solvents. The amount of chain stoppers and of branching agents depends on the molar amount of diphenolate radicals corresponding to the formula (I) and if appropriate formula (VII); if chlorocarbonic acid esters are also used, the amount of phosgene can be correspondingly reduced in a known manner.

Examples of suitable organic solvents for the chain stoppers and if appropriate for the branching agents and the chlorocarbonic acid esters are methylene chloride, chlorobenzene, acetone, acetonitrile and mixtures of these solvents, in particular mixtures of methylene chloride and chlorobenzene. If appropriate, the chain stoppers and branching agents used may be dissolved in the same solvent.

Methylene chloride, chlorobenzene and mixtures of methylene chloride and chlorobenzene, for example, may be used as the organic phase for the phase interface polycondensation.

Aqueous NaOH solution, for example, is used as the aqueous alkaline phase.

The formation of the polycarbonates by phase interface polycondensation may be catalyzed in the customary manner by catalysts such as tertiary amines, in particular tertiary aliphatic amines, such as tributylamine or triethylamine; the catalysts may be employed in amounts of 0.05 to 10 mol %, based on the mol of diphenols employed. The catalysts can be added before the start of the phosgenation or during or after the phosgenation.

The polycarbonates may also be prepared by the known process in a homogeneous phase, the so-called "pyridine process" and by the known melt transesterification process, using, for example, diphenyl carbonate instead of phosgene.

The polycarbonates preferably have molecular weights Mw (weight-average, determined by gel chromatography after prior calibration) of at least 10,000, particularly preferably of 10,000 to 200,000 and in particular of 20,000 to 80,000. They may be linear or branched and include homopolycarbonates or copolycarbonates based on the diphenols of the formula (I).

Polycarbonates (a) in the sense of the invention are thus high molecular weight thermoplastic aromatic polycarbonates which have Mw (weight-average molecular weight) of at least 15,000, preferably of 20,000 to 180,000, and contain bifunctional carbonate structural units of the formula (Ia)

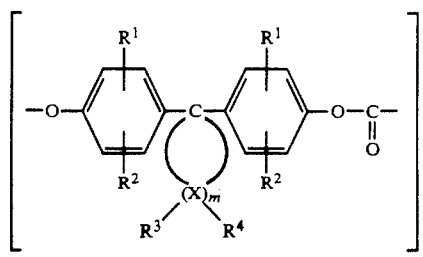

wherein X, $R^1$, $R^2$, $R^3$, $R^4$ and m have the meaning given for formula (I), in amounts of 100 mol % to 2 mol %, preferably in amounts of 100 mol % to 5 mol %, and in particular in amounts of 100 mol % to 10 mol %, and especially 100 mol % to 20 mol %, in each case based on the total amount of 100 mol % of difunctional carbonate structural units in the polycarbonate.

The polycarbonates thus contain in each case complementary amounts to make up to 100 mol % of other difunctional carbonate structural units, for example those of the formula (VIIa)

(VIIa)

that is to say in amounts of 0 mol % (inclusive) to 98 mol % inclusive, preferably 0 mol % to 95 mol %, and in particular 0 mol % to 90 mol %, and especially preferably 0 mol % to 80 mol %, in each case based on the total amount of 100 mol % difunctional carbonate structural units in the polycarbonate [—Z— in formula (VIIa) corresponds to the —Z— in formula (VII)].

By incorporation of the diphenols of the formula (I), new polycarbonates with a high heat distortion point and which also otherwise have good properties have been formed. This particularly applies to the polycarbonates based on the diphenols (I) in which m is 4 or 5, and especially to the polycarbonates based on the diphenols (Ib)

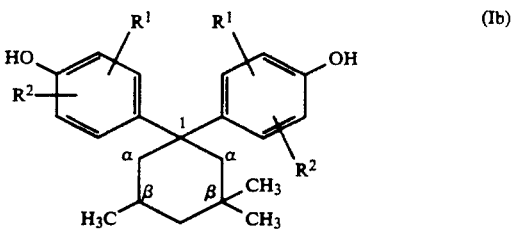

(Ib)

wherein $R^1$ and $R^2$ independently of one another have the meaning given for formula (I) and especially preferably are hydrogen.

The preferred polycarbonates are those in which m in the structural units of the formula (Ia) is 4 or 5, and especially those of units of the formula (Ic)

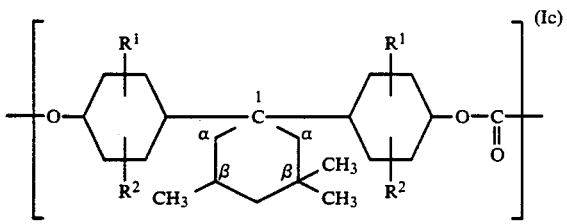 (Ic)

wherein R¹ and R² have the meaning given for formula (Ia), but particularly preferably are hydrogen.

These polycarbonates based on the diphenols of the formula (Ib) wherein, in particular, R¹ and R² are hydrogen, moreover have, in addition to a high heat distortion point, a good UV stability and good flow properties in the melt, which was not to be expected.

The polycarbonate properties can moreover be varied in a favorable manner by any desired combination with other diphenols, in particular with those of the formula (VII).

Polycarbonates b)

These are aromatic polycarbonates which are known per se and have been prepared from diphenols other than those of the dihydroxydiphenylcycloalkanes of the formula (I).

Polycarbonates (b) which can be employed are homo- and copolycarbonates, such as are described e.g. in U.S. Pat. Nos. 2,999,835, GB-PS 772 627 and DE-OS 3 334 872. Polycarbonates from bisphenol A are particularly preferred.

Silicone rubbers (c)

Silicone rubbers (c) used according to the invention consist predominantly of structural units

wherein R¹ and R² can be identical or different and denote $C_1$-$C_6$-alkyl or cyclohexyl or $C_6$-$C_{12}$-aryl.

Preferred silicone rubbers (c) are in particle form with an average particle diameter $d_{50}$ of 0.09 to 1 μm, preferably 0.09-0.4 νm, and a gel content of more than 70 wt. %, in particular 73-98 wt. %, and are obtainable from
1) dihalogenoorganosilanes
2) 0-10 mol %, based on 1), of trihalogenosilanes and
3) 0-3 mol %, based on 1), of tetrahalogenosilanes and
4) 0-0.5 mol % based on 1), of halogenotriorganosilanes, the organic radicals in the compounds 1), 2) and 4) being
α) $C_1$-$C_6$-alkyl or cyclohexyl, preferably methyl or ethyl
β) $C_6$-$C_{12}$-aryl, preferably phenyl
γ) $C_1$-$C_6$-alkenyl, preferably vinyl or allyl
δ) mercapto-$C_1$-$C_6$-alkyl, preferably mercaptopropyl
with the proviso that the sum (γ+δ) is 2-10 mol %, based on all the organic radicals of the compounds 1), 2) and 4), and the molar ratio γ:δ=3:1 to 1:3, preferably 2:1 to 1:2.

Preferred silicone rubbers (c) contain as organic radicals at least 80 mol % methyl groups. The end group is in general a diorganyl-hydroxyl-siloxy unit, preferably a dimethylhydroxysiloxy unit. Silanes 1) to 4) which are preferred for the preparation of the silicone rubbers (c) contain chlorine as the halogen substituent.

"Obtainable" means that the silicone rubber (c) does not necessarily have to be prepared from the halogen compounds 1) to 4). The intention is also to include silicone rubbers (c) of the same structure which have been prepared from silanes with other hydrolyzable groups, such as e.g. $C_1$-$C_6$-alkoxy groups, or from cyclic siloxane oligomers.

Silicone graft rubbers are mentioned as a particularly preferred component (c). These may be prepared, for example, by a three-stage process.

In the first stage, monomers, such as dimethyldichlorosilane, vinylmethyldichlorosilane or dichlorosilanes with other substituents, are converted into the cyclic oligomers (octamethylcyclotetrasiloxane or tetravinyltetramethylcyclotetrasiloxane) which are easy to purify by distillation. (C.f. Chemie in unserer Zeit 4 (1987), 121-127.).

In the second stage, the crosslinked silicone rubbers are obtained from these cyclic oligomers by addition of mercaptopropylmethyldimethoxysilane by ring-opening cationic polymerization.

In the third stage, the resulting silicone rubbers which have vinyl and mercapto groups with grafting activity are subjected to free radical grafting polymerization with vinyl monomers (or mixtures).

Preferably, mixtures of cyclic siloxane oligomers, such as octamethylcyclotetrasiloxane and tetramethyltetravinylcyclotetrasiloxane, are subjected to ring-opening cationic polymerization in emulsion in the second stage. The silicone rubbers are obtained in particle form as an emulsion.

The procedure followed is preferably in accordance with GB-PS 1 024 014, with alkylbenzenesulphonic acids which act both as catalysts and as emulsifiers. After the polymerization, the acid is neutralized. Instead of alkylbenzenesulphonic acids, it is also possible to employ n-alkylsulphonic acids. It is also possible for co-emulsifiers also additionally to be employed alongside the sulphonic acids.

Co-emulsifiers may be nonionic or anionic. Anionic co-emulsifiers are, in particular, salts of n-alkyl- or alkylbenzenesulphonic acids. Nonionic co-emulsifiers include polyoxyethylene derivatives of fatty alcohols and fatty acids. Examples are POE (3)-lauryl alcohol, POE (20)-oleyl alcohol, POE (7)-nonyl alcohol or POE (10)-stearate. (The notation POE (number) . . . alcohol means that the number of units of ethylene oxide corresponding to the number has been added onto one molecule of . . . alcohol. POE stands for polyethylene oxide. The number is an average value.)

The groups with crosslinking and grafting activity (vinyl and mercapto groups, c.f. organic radicals γ and δ) may be introduced into the silicone rubber using corresponding siloxane oligomers. These are e.g. tetramethyl-tetravinylcyclotetrasiloxane or δ-mercaptopropylmethyldimethoxysilane or the hydrolysate thereof.

They are added to the main oligomer, e.g. octamethylcyclotetrasiloxane, in the desired amounts in the second stage.

The incorporation of longer-chain alkyl radicals, such as e.g. ethyl, propyl or the like, or the incorporation of phenyl groups can also be achieved analogously.

Adequate crosslinking of the silicone rubber may already be achieved if the radicals γ and δ react with one another during the emulsion polymerization, so that the further addition of a crosslinking agent can be dispensed with. However, a crosslinking silane may be added during the second reaction stage in order to increase the degree of crosslinking of the silicone rubber.

Branchings and crosslinking may be achieved by addition of e.g. tetraethoxysilane or a silane of the formula

wherein
X is a hydrolyzable group, in particular an alkoxy or halogen radical, and
y is an organic radical.

Preferred silanes y-SiX$_3$ are methyltrimethoxysilane and phenyltrimethoxysilane.

The average particle diameter d$_{50}$ of the silicone rubbers is the diameter above and below which in each case 50 wt. % of the particles lie. It can be determined by ultracentrifuge measurements (W. Scholtan, H. Lange, Kolloid. Z. and Z. Polymere 250 (1972), 782–796).

The gel content is determined at 25° C. in acetone (c.f. DE-AS 2 521 288, p. 6, 1. 17–37). In the silicone rubbers according to the invention, it is at least 70%, preferably 73–98 wt. %.

Grafted silicone rubbers (c) may be prepared by free radical grafting polymerization, for example analogously to DE-PS 2 421 288.

To prepare the grafted silicone rubber in the third stage, the grafting monomers may be subjected to free radical grafting polymerization in the presence of the silicone rubber, in particular at 40 to 90° C. The grafting polymerization may be carried out in suspension, dispersion or emulsion. Continuous or discontinuous emulsion polymerization are preferred. This grafting polymerization is carried out with free radical initiators (e.g. peroxides, azo compounds, hydroperoxides, persulphates or perphosphates) and if appropriate using anionic emulsifiers, e.g. carboxonium salts, sulphonic acid salts or organic sulphates. Graft polymers with high grafting yields are formed here, i.e. a high content of the polymer of the grafting monomers is bonded chemically to the silicone rubber. The silicone rubber has radicals with grafting activity, so that particular measures for heavy grafting are superfluous.

The grafted silicone rubbers (c) are prepared by grafting polymerization of 5 to 90 parts by wt., preferably 20 to 80 parts by wt., of a vinyl monomer or a vinyl monomer mixture onto 10 to 95, preferably 20 to 80 parts by wt. silicone rubber.

A particularly preferred vinyl monomer is methyl methacrylate. Suitable vinyl monomer mixtures consist of 50–95 parts by wt. styrene, α-methylstyrene (or other styrenes alkyl- or halogen-substituted in the nucleus) or methyl methacrylate on the one hand and of 5–50 parts by wt. acrylonitrile, methacrylonitrile, methyl methacrylate, maleic anhydride or substituted maleimide on the other hand. Smaller amounts of acrylic acid esters of primary or secondary aliphatic C$_2$–C$_{10}$-alcohols, preferably n-butyl acrylate, or the acrylic or methacrylic acid ester of tert.-butanol, preferably t-butyl acrylate, can additionally be present as other vinyl monomers. A particularly preferred monomer mixture is 30 to 40 parts by wt. α-methylstyrene, 52 to 62 parts by wt. methyl methacrylate and 4 to 14 parts by wt. acrylonitrile.

The silicone rubbers (c) grafted in this way may be worked up in a known manner, e.g. by coagulation of the lattices with electrolytes (salts, acids or mixtures thereof) and subsequent purification and drying.

In the preparation of the grafted silicone rubbers (c), in general free polymers or copolymers of the grafting monomers which form the grafted shell are formed to a certain degree in addition to the actual graft copolymer. The product obtained by polymerization of the grafting monomers in the presence of the silicone rubber, that is to say, in general a mixture of graft copolymer and free (co-)polymer of the grafting monomers, is called a grafted silicone rubber here.

The molding compositions according to the invention have optimum properties if the amount of free (co-)polymer does not exceed 50, preferably 30, in particular 20 wt. %, based on component C.

The molding compositions according to the invention may contain the customary amounts of further additives which are known for their utility in aromatic polycarbonates and for silicone graft rubbers, such as stabilizers, pigments, mold release agents, flameproofing agents and/or antistatics.

The molding compositions according to the invention may be prepared by mixing the constituents in a known manner and subjecting the mixture to melt compounding or melt extrusion at elevated temperatures, preferably at 200 to 350° C., in the customary devices, such as internal kneaders, extruders or twin-screw extruders. The individual components may be mixed in succession or simultaneously.

The present invention thus also relates to a process for the preparation of thermoplastic molding compositions containing components (a), (b) and (c) and if appropriate stabilizers, pigments, mold release agents, flame-proofing agents and/or antistatics, which is characterized in that components (a), (b) and (c) and if appropriate stabilizers, pigments, mold release agents, flameproofing agents and/or antistatics are mixed in a known manner and the mixture is subjected to melt compounding or melt extrusion at elevated temperatures, preferably at temperatures from 200° C. to 350° C., in customary devices, such as internal kneaders, extruders or twin-screw extruders.

The molding compositions according to the invention may be used for the production of all types of shaped articles, e.g. by injection molding. Examples of shaped articles are: housing components (e.g. for domestic appliances, such as juice presses, coffee machines, mixers and microwave utensils), covering plates for the building trade and car components. They are also employed for electrical equipment, e.g. for plug receptacles, coil forms and printed circuit boards.

Shaped articles can also be produced by thermoforming from previously produced sheets or films.

The invention thus furthermore relates to the use of the molding compositions described for the production of shaped articles.

Polycarbonates (a)

1) Preparation of a bisphenol of the formula (I)

7.5 mol (705 gm) phenol and 0.15 mol (30.3 gm) dodecylthiol are initially introduced into a 1 liter round-bottomed flask with a stirrer, dropping funnel, thermometer, reflux condenser and gas inlet tube and are saturated with dry HCl gas at 28°-30° C. A solution of 1.5 mol (210 gm) dihydroisophorone (3,3,5-trimethyl-cyclohexane-1-one) and 1.5 mol (151 gm) phenol are added dropwise to this solution in the course of 3 hours, HCl gas still being passed through the reaction solution. HCl gas is then passed in for a further 5 hours. The mixture is allowed to after-react at room temperature for 8 hours. The excess phenol is then removed by steam distillation. The residue is extracted hot twice with petroleum ether (60–90) and once with methylene chloride and filtered off.

Yield: 370 gm
Melting point: 205°-207° C.

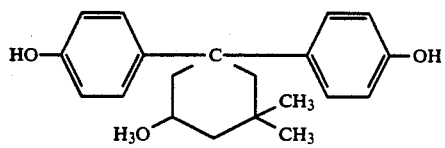

2) Preparation of a copolycarbonate (a)

1,436.4 gm (6.3 mol) bisphenol A (2,2-bis(4-hydroxyphenyl)propane), 2,387.0 gm (7.7 mol) bisphenol of the formula (I), 7,476.0 gm (84 mol) 45% NaOH and 33.7 liter water are dissolved in an inert gas atmosphere, while stirring. A solution of 36.9 gm (0.392 mol) phenol in 11 liter methylene chloride and 13 liter chlorobenzene is then added. 2,772 gm (28 mol) phosgene are passed into the well-stirred solution at pH 13–14 and 21-25° C. Thereafter, 14 milliliter ethylpiperidine are added and the mixture is stirred for a further 45 min. The bisphenolate-free aqueous phase is separated off and, after acidification with phosphoric acid, the organic phase is washed with water until free from electrolytes and freed from the solvent. Relative viscosity = 1.30 (in methylene chloride at 25° C. and a concentration of 0.5 gm/dl). Glass transition temperature $T_g$ = 206° C. (DSC).

Polycarbonates (b)

Polycarbonates of bisphenol A having a relative viscosity of 1.22 in methylene chloride at 25° C. and a concentration of 0.5 gm/dl).

Silicone graft rubber (c)

1. Preparation of the silicone rubber emulsion 38.4 parts by wt. octamethylcyclotetrasiloxane, 1.2 parts by wt. tetramethyltetravinylcyclotetrasiloxane and one part by wt. mercaptopropylmethyldimethoxysilane are stirred with one another. 0.5 parts by wt. dodecylbenzenesulphonic acid is added, followed by 58.4 parts by wt. water within one hour. During this procedure, the mixture is stirred intensively. The pre-emulsion is homogenized twice under 200 bar with the aid of a high pressure emulsifying machine. A further 0.5 part by wt. dodecylbenzenesulphonic acid is added. The emulsion is stirred at 85° C. for 2 hours and then at 20° C. for 36 hours. It is neutralized with 5 N NaOH. A stable emulsion with a solids content of about 36 wt. % results. The polymer has a gel content of 82 wt. %, measured in toluene; the average particle diameter $d_{50}$ is 300 nm.

2. Preparation of the grafted silicone rubber

The following are initially introduced into a reactor:

2,107 parts by wt. latex according to 1) and
1,073 parts by wt. water.

After initiation with a solution of 7.5 parts by wt. potassium peroxydisulphate in 195 parts by wt. water at 65° C., in each case the following solutions are fed in uniformly in the course of 4 hours for preparation of the graft rubber:

Solution 1:
540 parts by wt. styrene and
210 parts by wt. acrylonitrile;

Solution 2:
375 parts by wt. water and
15 parts by wt. sodium salt of $C_{14}$-$C_{18}$-alkyl-suphonic acids.

Polymerization is then brought to completion in each case at 65° C. within 6 hours. A latex with a solids content of about 33 wt. % results.

After coagulation with an aqueous magnesium chloride/acetic acid solution, filtration and drying in vacuo, the graft polymers are obtained in the form of a white powder.

Preparation of the mixtures

The constituents were homogenized in a 1.3 liter internal kneader at temperatures of 260°-320° C. (see table 1).

Bars measuring 80×10×4 mm were then molded on an injection molding machine and the notched impact strength $a_k$ according to Izod (ISO 180) and the heat distortion point Vicat B (DIN 53 460) were determined.

TABLE 1

| Example | | 1* | 2 | 3 | 4 |
|---|---|---|---|---|---|
| Polycarbonate (a) | parts by wt. | — | 10 | 20 | 40 |
| Polycarbonate (b) | parts by wt. | 80 | 70 | 60 | 40 |
| Silicone rubber (c) | parts by wt. | 20 | 20 | 20 | 20 |
| $a_k$ [kj/m²] | | | | | |
| +20° C. | | 54 | 52 | 49 | 42 |
| −20° C. | | 44 | 43 | 41 | 31 |
| Vicat B/120 [°C.] | | 140 | 145 | 150 | 161 |

$a_k$: notched impact strength
*: comparison experiment

Examples 2–4 according to the invention illustrate that the heat distortion point is improved significantly, the toughness largely being retained.

What is claimed is:

1. A thermoplastic molding composition comprising a mixture of
   (a) 1–99 wt. % polycarbonates prepared from a mixture of diphenols comprising
      (1) 100 to 2 mol %, based on the total of diphenols (a), of a dihydroxydiphenylcycloalkane of the formula

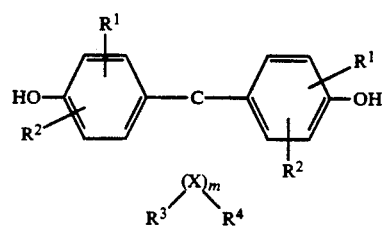

wherein $R^1$ and $R^2$ independently denote hydrogen, halogen, $C_1$-$C_8$-alkyl, $C_5$-$C_6$-cycloalkyl, $C_6$-$C_{10}$-aryl or $C_7$-$C_{12}$-aralkyl, m denotes an integer from 4 to 7, $R^3$ and $R^4$ are selected individually for each X and independently of one another denote hydrogen or $C_1$-$C_6$-alkyl, and X denotes carbon, with the proviso that on at least one atom X, $R^3$ and $R^4$ are both alkyl, (2) 2 to 98 mol %, based on the total of diphenols (a), of a diphenol different from component (a)(1);

(b) 1-99 wt. % of other polycarbonates; and (c) 1-95 wt. % of a silicone rubber.

2. The composition of claim 1, in which component (b) is a polycarbonate or copolycarbonate based on bisphenol A.

3. The composition of claim 1, in which component (c) is a grafted silicone rubber.

4. The composition of claim 1 in which component (c) is a grafted silicone comprising a graft polymer of (1) 5-90 parts by wt. of a mixture of
  (i) 50-95 parts by wt. styrene or styrene substituted in the aromatic nucleus by at least one member selected from the group consisting of halogen and methyl, α-methylstyrene, methyl methacrylate, or mixtures of these compounds, and
  (ii) 5-50 parts by wt. acrylonitrile, methacrylonitrile, $C_1$-$C_8$-alkyl acrylates, $C_1$-$C_{16}$-alkyl methacrylates, maleic anhydride, $C_1$-$C_4$-alkyl or phenyl-N-substituted maleimide, or mixtures of these compounds,
grafted on
(2) 10-95 parts by wt. silicone rubber having an average particle diameter $d_{50}$ of 0.09 to 1 μm and a gel content of more than 70.

5. The composition of claim 4 in which the silicone rubber is obtained from
  (1) dihalogenodiorganosilanes,
  (2) 0-10 mol % trahalogenoorganosilane,
  (3) 0-3 mol % tetrahalogenosilane and
  (4) 0-0.5 mol % halogenotriorganosilanes,
wherein the organic radicals of the compounds (1), (2), and (4) are one or more substituents selected from the group consisting of
  (α) $C_1$-$C_6$-alkyl or cyclohexyl,
  (β) $C_6$-$C_{12}$-aryl,
  (γ) $C_1$-$C_6$-alkenyl, and
  (δ) mercapto-$C_1$-$C_6$-alkyl,
with the proviso that the sum (γ+δ) is 2 to 10 mol %, based on all the organic radicals of the compounds (1), (2), and (4), and the molar ratio γ:δ is 3:1 to 1:3.

6. The composition of claim 4, in which the particle diameter $d_{50}$ of the silicone rubber is 0.09 to 0.4 μm.

7. The composition of claim 4, in which the gel content of the silicone rubber is 73 to 98 wt. %.

8. The composition of claim 5, in which at least 80 mol % of the organic radicals of components (1), (2), and (4) are methyl, the radicals γ are vinyl and/or allyl groups and the radicals δ are mercaptopropyl radicals.

9. The composition of claim 1, which additionally contains at least one member selected from the group consisting of stabilizers, pigments, mold release agents, flameproofing agents and antistatics.

10. A process for the preparation of the composition of claim 1 comprising
  (1) forming a mixture of components (a), (b) and (c) and
  (2) subjecting said mixture to melt compounding or melt extrusion at an elevated temperature in an internal kneader, an extruder, or a twin-screw extruder.

* * * * *